June 27, 1961
W. V. CHERY
2,989,803
METHOD OF MAKING SLIDE FASTENER ELEMENTS
Original Filed March 1, 1957
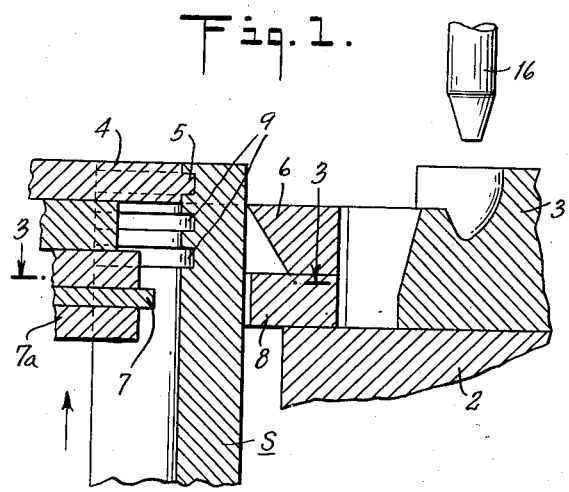
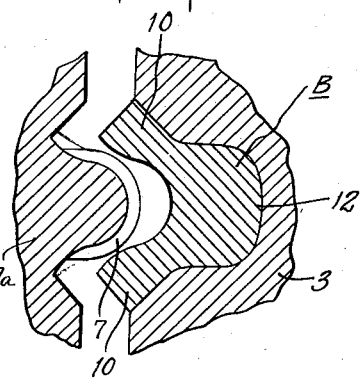
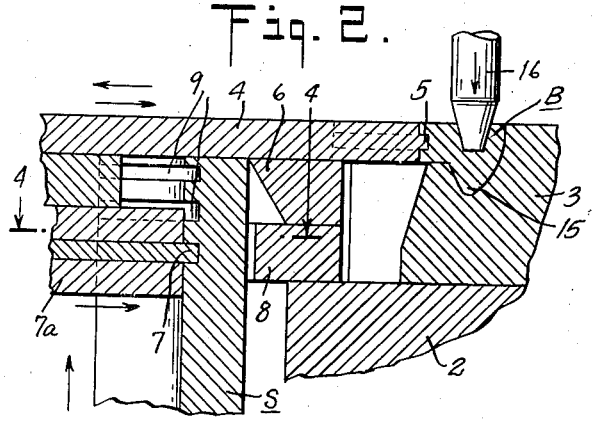
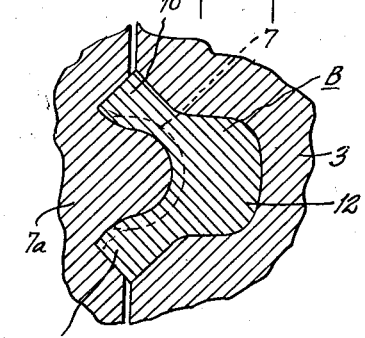
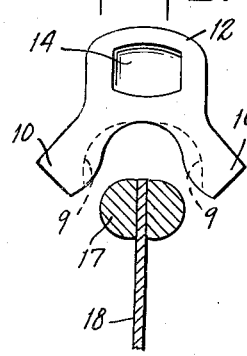
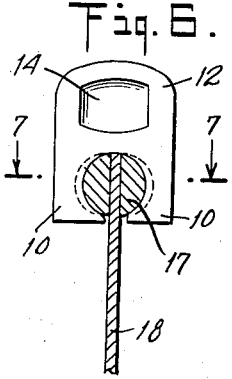
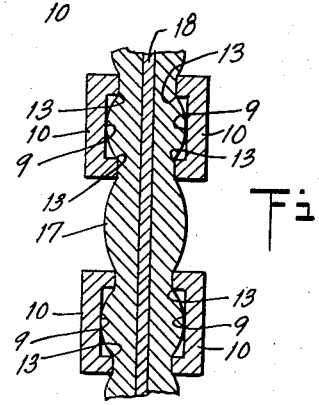
INVENTOR.
WALTER V. CHERY
BY
R. E. Meech
ATTORNEY United States Patent Office 2,989,803
Patented June 27, 1961

2,989,803
METHOD OF MAKING SLIDE FASTENER ELEMENTS
Walter V. Chery, Meadville, Pa.
Original application Mar. 1, 1957, Ser. No. 643,335. Divided and this application July 22, 1959, Ser. No. 834,906
5 Claims. (Cl. 29—410)

This invention relates to slide fasteners, and more particularly to an improved fastener element therefor and method of making the same.

This application is a division of application Serial No. 643,335, filed March 1, 1957.

In the manufacture of slide fasteners, it is the conventional practice to provide a series of interlocking fastener elements with each having a pair of spaced-apart leg or jaw portions by means of which the elements are clamped or attached to the beaded edge of a stringer tape. The inner surfaces of the elements are usually straight and relatively smooth and at times tend to be moved or displaced along the beaded edge after repeated closing and opening of the fastener eventually resulting in an inoperative fastener. Not only do the elements tend to become misplaced therealong but at times they become displaced entirely therefrom which also results in a defective fastener. It is to an improved fastener element and method of making the same that the present invention relates in order to overcome the above mentioned disadvantages so as to provide an improved fastener construction.

It is the primary object of this invention to provide an improved method of making fastener elements for slide fasteners which increases materially the strength of the finished fastener, such elements having the outward appearance of the conventional type, each having interlocking means on the head portion thereof consisting of a projection and recess and a pair of spaced-apart jaws or legs at the other end for clamping the elements to the beaded edge of a tape with means arranged on the inner surfaces of the jaws or legs to aid in gripping more securely the beaded edge than in the conventional type of element.

It is a more specific object of the present invention to provide an improved method of making fastener elements wherein there is formed in the opposed surfaces of the leg portions thereof channels or grooves into which the beaded edge of the stringer tape expands when the leg portions are clamped to the beaded edge thereby aiding in preventing displacement of the elements therealong and therefrom.

It is another object of this invention to provide an improved method of making fastener elements for slide fasteners which is simple and inexpensive and, at the same time, efficient and effective in its practice.

Various other objects and advantages of this invention will be more apparent in the course of the following specification, and will be particularly pointed out in the appended claims.

In the accompanying drawings, there is shown for the purpose of illustration, an embodiment which my invention may assume in practice.

In these drawings:

FIG. 1 is a sectional view of apparatus for practicing my invention showing the first step in cutting the fastener element from the strip, FIG. 2 is a sectional view similar to FIG. 1, showing the second step in forming the element, FIG. 3 is a sectional view taken on line 3—3 of FIG. 1, FIG. 4 is a sectional view taken on line 4—4 of FIG. 2, FIG. 5 is a plan view of a fastener element before the same is attached to the stringer tape shown therebelow, FIG. 6 is a plan view of a fastener element showing the same attached to the stringer tape, and FIG. 7 is a sectional view taken on line 7—7 of FIG. 6 showing two elements attached to the stringer tape.

A machine of the type similar to that as disclosed in the patent to Gideon Sundback, No. 1,467,015, granted September 4, 1923, can be most successfully used for practicing the present invention. In such a machine it is necessary to provide a wire rolled to a special cross section (substantially Y-shaped). The formed wire is fed upwardly into the machine and substantially Y-shaped blanks are sliced successively off the end thereof by means of a cutting knife. The blanks are then moved and positioned by the cutting knife in one of a series of dies arranged around the circumferential edge of a rotatable dial. After the blanks are positioned in the forming die, an interlocking recess and projection is formed in the head portion thereof by means of a forming punch so as to provide a finished fastener element. The dial is then rotated and the jaw or leg portions of the elements are clamped around the beaded edge of a stringer tape, in a well known manner, by means of suitable side tools.

In the portion of the machine illustrated in FIGS. 1 through 4 of the drawings, there is shown a rotatable dial 2 having a forming die 3 carried thereby. Forwardly of the die 3, or to the left side as shown in FIGS. 1 and 2, there is arranged a reciprocable cutting knife 4. In accordance with the present invention, there is arranged on the extreme end of this cutting knife, a projecting portion 5 for a purpose hereinafter to be described. There is positioned opposite the knife 4, a cutting off die 6 with which the knife 4 co-operates to cut blanks B from the formed strip S as the strip is intermittently moved upwardly therebetween.

Also, in accordance with the present invention, below the knife 4, there is mounted in a reciprocable tool holder 7a, a forming tool 7 and directly opposite the forming tool on the opposite of the strip S there is positioned an anvil 8 with which the forming tool 7 co-operates to form a series of spaced-apart grooves or channels 9, three in the present instance, in the strip in a manner and for a purpose hereinafter to be described.

In practicing the invention, the strip S is fed upwardly between the cutting knife 4 and the cutting off die 6, and the forming tool 7 and the opposed anvil 8. As the strip S is fed intermittently upwardly the forming tool 7 in co-operation with the anvil 8 forms a groove or channel 9 on the inner side of the leg portions of the strip S, as more clearly shown in FIG. 2 of the drawings. Simultaneously, with the forming of the groove and channel 9, a blank B is cut from the upper end of the formed strip S by means of the cutting knife 4 in co-operation with the die 6. It will be seen that the projecting portion 5 of the knife is positioned in the groove or channel 9 when the blank is cut from the strip. This groove or channel having been previously formed therein by the tool 7. This cut blank B is then positioned in the forming die 3 by the knife 4, upon continued movement thereof. The cutting knife 4, together with the forming tool 7, are then moved to their retracted position, as shown in FIG. 1, and the strip S is then fed upwardly a distance the thickness of a single fastener element in position for the next forming and cutting operation on the strip.

As a result, it will be seen that a fastener blank B has been formed which is substantially Y-shaped having a pair of spaced-apart leg or jaw portions 10 and a head portion 12, as shown in FIG. 4, and on the inner side of the leg portions 10, there is provided centrally thereof the groove or channel 9 which is preferably rectangular-shaped in cross section so as to provide relatively sharp corners, as at 13. As a result, it will be seen that each of the intermediate portions of each of the leg portions 10 has a thickness in a transverse plane substantially less than the outer edge portions thereof. After the blank B is positioned in the forming die 3, there is formed on the head portion 12 thereof a recess 14 and a projection 15 by means of a forming punch 16 which co-operates with the die 3, as shown in FIG. 2, in a well known manner.

Thus, it will be seen that there is now provided a finished fastener element, as shown in FIG. 5, in readiness to be attached to the beaded edge 17 of a stringer tape 18. It will be understood that the forming die 3 together with the fastener element positioned therein is then moved to an attaching station and the leg or jaw portions 10 of the element are clamped around the beaded edge 17 of the stringer tape 18 by a mechanism (not shown) so as to provide a fastener stringer, as shown in FIGS. 6 and 7 of the drawings.

After the leg portions 10 of the fastener elements have been clamped to the beaded edge of the stringer tape, it will be seen that the beaded edge 17 tends to expand into the opposed grooves or channels 9 of each of the elements, as shown in FIG. 7. By providing such an arrangement, it will be seen that these grooves or channels together with the sharp corners or shoulders 13 tend to aid in preventing the elements from being displaced along or longitudinally of the beaded edge of the tape which is the most important aspect of the present invention.

As a result of my invention, it will be seen that there is provided an improved interlocking fastener element for slide fasteners and method of making the same. The provision of these channels or grooves 9 provides a fastener having increased strength and life and a fastener that is much stronger than any fastener now made by the conventional method. It will be noted that these channels or grooves 9 in the leg portions of the blanks together with the projecting portion 5 of the knife with which they co-operate also aid to position the blanks in the forming die. Another advantage of my method is that the tools for practicing the same are extremely simple and can be inexpensively and conveniently incorporated with existing equipment without the necessity of any material changes in the design or construction thereof.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. The method of making slide fastener elements which comprises forming a substantially Y-shaped blank having a head portion and a pair of spaced-apart leg portions, deforming the opposed inner wall faces of the leg portions so as to form elongated channels therein, deforming the head portion so as to form interlocking surfaces thereon, and finally attaching the formed element to the beaded edge of a stringer tape whereby the beaded edge expands into the opposed channels of the leg portions of the element.

2. The method of making slide fastener elements which comprises forming a substantially Y-shaped blank having a head portion and a pair of spaced-apart leg portions, simultaneously deforming the opposed inner wall faces of the leg portions so as to form elongated channels therein, positioning the deformed blank in a deforming die, wherein one side of the head portion is deformed so as to form a recess therein and the opposite side thereof is deformed so as to form a corresponding projection thereon whereby a finished element is provided, and finally attaching the formed element to the beaded edge of a stringer tape whereby the beaded edge expands into the opposed channels of the leg portions of the element.

3. The method of making slide fastener elements having a head portion and a pair of spaced-apart leg portions connected thereto which comprises deforming a strip of material into a cross section conforming substantially to the contour of an individual fastener element which is substantially Y-shaped in cross section, deforming the opposed inner wall faces of the leg portions of the strip at points spaced apart substantially the thickness of an individual element so as to form spaced apart elongated channels therein, and successively cutting blank members from the end of the strip so that an elongated channel is arranged centrally of each of the jaw portions of said blank.

4. The method of making slide fastener elements having a head portion and a pair of spaced-apart leg portions connected thereto which comprises forming a strip of material into a cross section conforming to substantially the contour of an individual fastener element which is substantially Y-shaped in cross section, deforming the opposed inner wall faces of the leg portions of the strip at points spaced apart substantially the thickness of an individual element so as to form elongated channels therein, successively cutting blank members from the end of the strip so as to provide a fastener blank having spaced-apart leg portions and a head portion and having an elongated channel arranged centrally of each of the jaw portions of each of said blanks, deforming the head portion so as to form interlocking surfaces on the head portion of each of said blanks whereby a finished element is provided, and finally attaching the formed elements to the beaded edge of a stringer tape whereby the beaded edge expands into the channels in the opposed leg portions of each of the elements.

5. The method of making slide fastener elements having a head portion and a pair of spaced-apart leg portions connected thereto which comprises forming a strip of material into a cross section conforming to substantially the contour of an individual fastener element which is substantially Y-shaped in cross section, simultaneously deforming the opposed inner wall faces of the leg portions of the strip at points spaced apart substantially the thickness of an individual element so as to form elongated channels therein, successively cutting blank members from the end of the strip so as to provide a fastener blank having spaced-apart leg portions and a head portion and having an elongated channel arranged centrally of each of the leg portions of each of said blanks, positioning the deformed blanks in a deforming die wherein one side of the head portion is deformed so as to form a recess therein and the opposite side thereof is deformed so as to form a corresponding projection thereon whereby finished fastener elements are provided, and finally attaching the elements to the beaded edge of a stringer tape whereby the beaded edge expands into the channels in the opposed leg portions of each of the elements.

References Cited in the file of this patent

UNITED STATES PATENTS

| | | |
|---|---|---|
| 1,467,015 | Sundback (A) | Sept. 4, 1923 |
| 1,653,320 | Sundback | Dec. 20, 1927 |
| 1,991,321 | Gilmore | Feb. 12, 1935 |
| 2,075,762 | Kelley | Mar. 30, 1937 |
| 2,508,782 | Carlile | May 23, 1950 |

FOREIGN PATENTS

| | | |
|---|---|---|
| 649,717 | Germany | Sept. 1, 1937 |